(12) United States Patent
Sheu et al.

(10) Patent No.: US 7,111,719 B1
(45) Date of Patent: Sep. 26, 2006

(54) HUB CLUTCH DEVICE FOR BICYCLE

(75) Inventors: Tien-Chin Sheu, Ho Mei Chen (TW); Wen-Sheng Chen, Ho Mei Chen (TW)

(73) Assignee: Chosen Co., Ltd., Ho Mei Chen (TW)

( * ) Notice: Subject to any disclaimer, the term of this patent is extended or adjusted under 35 U.S.C. 154(b) by 189 days.

(21) Appl. No.: 10/935,667

(22) Filed: Sep. 7, 2004

(51) Int. Cl.
*F16D 41/36* (2006.01)

(52) U.S. Cl. ............... 192/64; 192/54.5; 192/66.2; 192/93 A

(58) Field of Classification Search ............... None
See application file for complete search history.

(56) References Cited

U.S. PATENT DOCUMENTS

| | | | |
|---|---|---|---|
| 932,328 A * | 8/1909 | Rockwell | 192/217.3 |
| 1,376,033 A * | 4/1921 | Page | 192/53.1 |
| 2,246,191 A * | 6/1941 | Schmitz | 192/64 |
| 3,709,341 A * | 1/1973 | Schulz | 192/64 |
| 4,013,151 A * | 3/1977 | Hillyer | 192/217.6 |
| 4,593,799 A * | 6/1986 | Ozaki | 192/46 |

* cited by examiner

*Primary Examiner*—Saul Rodriguez
(74) *Attorney, Agent, or Firm*—Alan D. Kamrath; Nikolai & Mersereau, P.A.

(57) ABSTRACT

A hub clutch device for a bicycle includes a threaded shaft, a hub, a positioning sleeve, a movable sleeve, an elastic member, a fixing seat, and a plurality of urging balls. Thus, each of the urging balls is moved between a respective one of the adjusting slots of the movable sleeve and a respective one of the adjusting slots of the fixing seat to detach the fixing seat and the movable sleeve from the positioning sleeve, so that when the positioning sleeve and the hub are rotated, the fixing seat is not rotated, so that the freewheel will not be rotated by the wheel when the pedal stops operating.

14 Claims, 6 Drawing Sheets

HUB CLUTCH DEVICE FOR BICYCLE

BACKGROUND OF THE INVENTION

1. Field of the Invention

The present invention relates to a hub clutch device, and more particularly to a hub clutch device for a bicycle.

2. Description of the Related Art

A conventional hub clutch device for a bicycle in accordance with the prior art shown in FIGS. 6 and 7 comprises a threaded shaft 601, a hub 60 rotatably mounted on the shaft 601 for mounting a wheel (not shown) and having an inner wall formed with a recess 602, a guide sleeve 65 mounted on the shaft 601 and located between two bearings 61 and 66, a fixed clutch 64 mounted on the guide sleeve 65 and having a plurality of ratchet teeth 641, a fixing seat 67 secured on the fixed clutch 64 to rotate the fixed clutch 64, a freewheel (not shown) mounted on the fixing seat 67 to rotate the fixing seat 67, a movable clutch 63 mounted on the guide sleeve 65 and having a plurality of ratchet teeth 631 meshing with the ratchet teeth 641 of the fixed clutch 64, and a spring 62 mounted on the guide sleeve 65 and biased between the movable clutch 63 and the hub 60.

In operation, when a pedal (not shown) of the bicycle is stepped, a chainwheel (not shown) is rotated to rotate a chain (not shown) which rotates the freewheel which rotates the fixing seat 67 which rotates the fixed clutch 64 which rotates the movable clutch 63 by engagement of the ratchet teeth 631 and 641. In such a manner, the movable clutch 63 is secured in the hub 60 so that the hub 60 is driven by the movable clutch 63 to rotate.

When the pedal stops operating, the freewheel stops rotating, so that the force applied on the fixing seat 67 is removed. At this time, the movable clutch 63 and the hub 60 are still rotated with the wheel. Thus, when the velocity of the fixing seat 67 and the fixed clutch 64 is smaller than that of the movable clutch 63 and the hub 60, the ratchet teeth 631 of the movable clutch 63 bias the spring 62 to disengage and pass through the ratchet teeth 641 of the fixed clutch 64, so as to detach the movable clutch 63 from the fixed clutch 64. Thus, when the movable clutch 63 and the hub 60 are rotated, the fixing seat 67 and the fixed clutch 64 are not rotated, so that the freewheel will not be rotated by the wheel when the pedal stops operating.

However, noise is produced when the ratchet teeth 631 of the movable clutch 63 pass through the ratchet teeth 641 of the fixed clutch 64, thereby producing noise when the wheel idles. In addition, it is necessary to have a precise fit between the ratchet teeth 631 of the movable clutch 63 and the ratchet teeth 641 of the fixed clutch 64, thereby increasing costs of fabrication.

SUMMARY OF THE INVENTION

In accordance with the present invention, there is provided a hub clutch device, comprising:

a threaded shaft;

a hub rotatably mounted on the shaft;

a positioning sleeve secured in the hub for rotating the hub and having a first end having an inner wall formed with a tapered face;

a movable sleeve movably mounted in the positioning sleeve and having a first end having an outer wall formed with a tapered face detachably urged on the tapered face of the positioning sleeve and a second end having a face formed with a plurality of arc-shaped adjusting slots;

an elastic member mounted on the shaft and biased between the hub and the movable sleeve;

a fixing seat rotatably mounted on the shaft and having a first end having a face formed with a plurality of arc-shaped adjusting slots each aligning with a respective one of the adjusting slots of the movable sleeve; and a plurality of urging balls each movably mounted between a respective one of the adjusting slots of the movable sleeve and a respective one of the adjusting slots of the fixing seat.

The primary objective of the present invention is to provide a hub clutch device, wherein each of the urging balls is moved between a respective one of the adjusting slots of the movable sleeve and a respective one of the adjusting slots of the fixing seat to detach the fixing seat and the movable sleeve from the positioning sleeve, so that when the positioning sleeve and the hub are rotated, the fixing seat is not rotated, so that the freewheel will not be rotated by the wheel when the pedal stops operating.

Another objective of the present invention is to provide a hub clutch device, wherein the movable sleeve is engaged with and disengaged from the positioning sleeve by engagement of the tapered faces, so that no noise is produced when the pedal stops operating.

A further objective of the present invention is to provide a hub clutch device, wherein it is unnecessary to have a precise fit between the urging balls, the adjusting slots of the movable sleeve and the adjusting slots of the fixing seat, thereby decreasing costs of fabrication.

Further benefits and advantages of the present invention will become apparent after a careful reading of the detailed description with appropriate reference to the accompanying drawings.

DETAILED DESCRIPTION OF THE INVENTION

Figure 1:
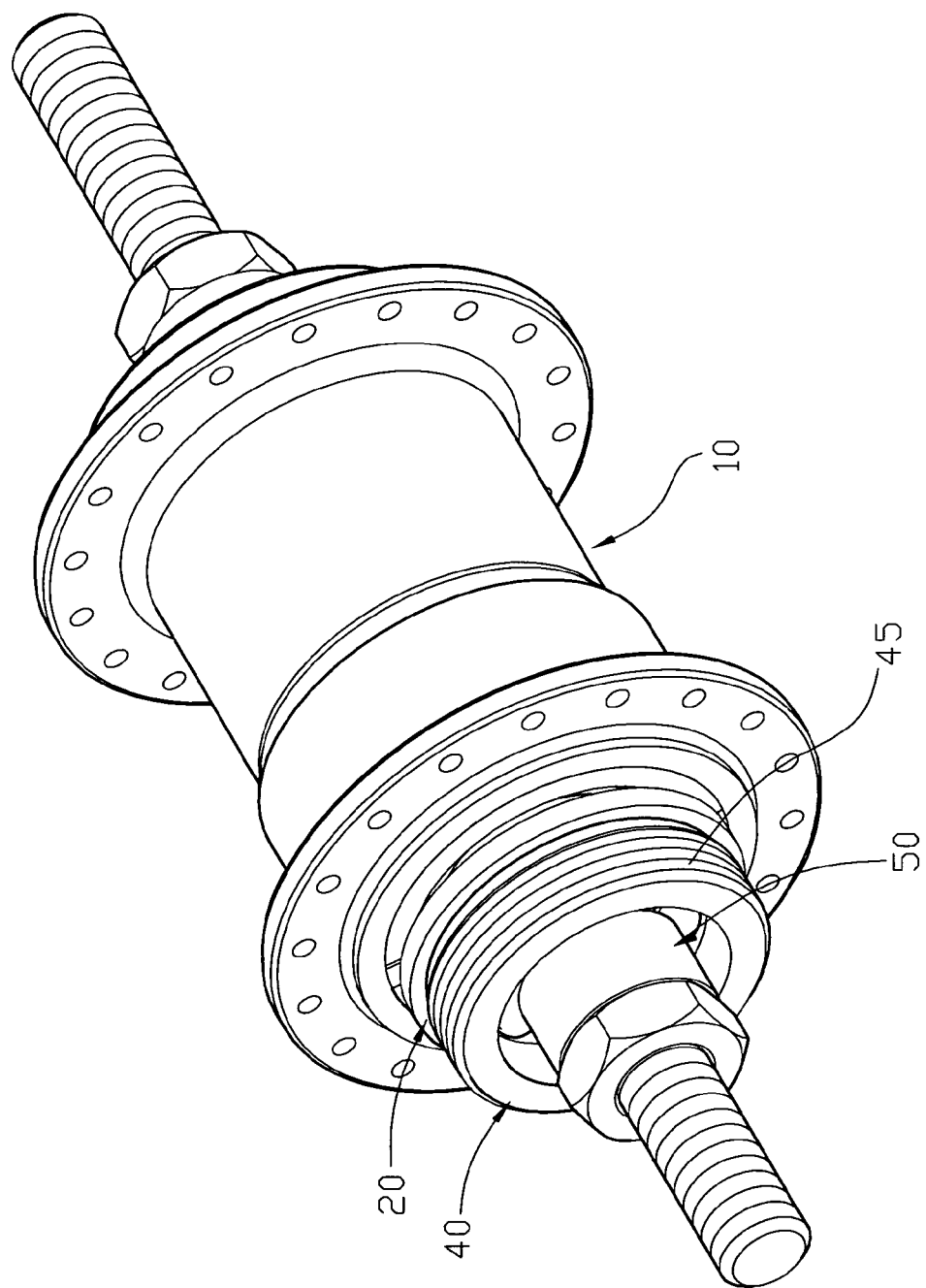
FIG. 1 is a perspective view of a hub clutch device in accordance with the preferred embodiment of the present invention.
Figures 2, 3:
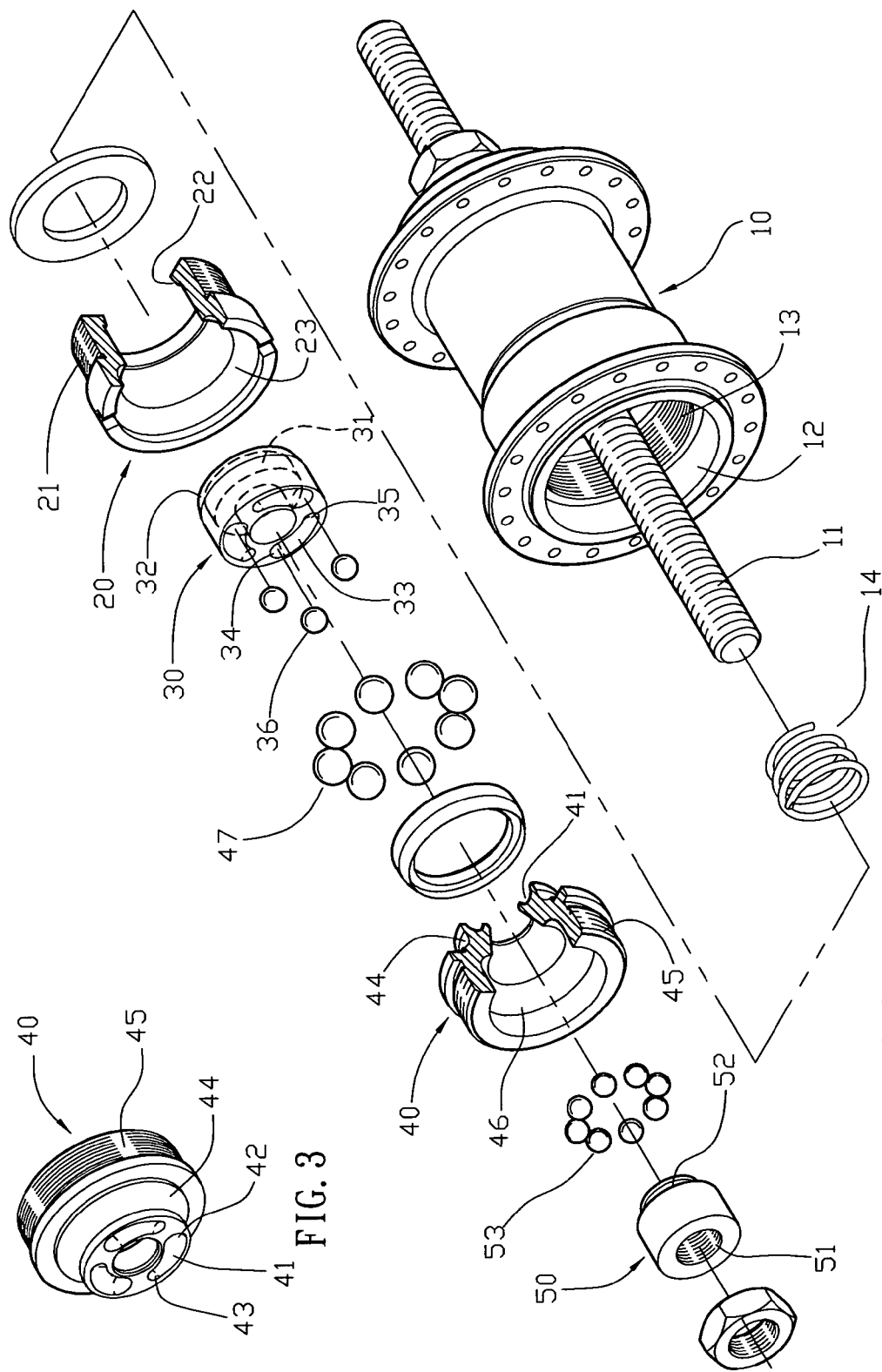
FIG. 2 is an exploded perspective view of the hub clutch device as shown in FIG. 1.
FIG. 3 is a partially perspective view of a fixing seat of the hub clutch device as shown in FIG. 2.
Figure 4:
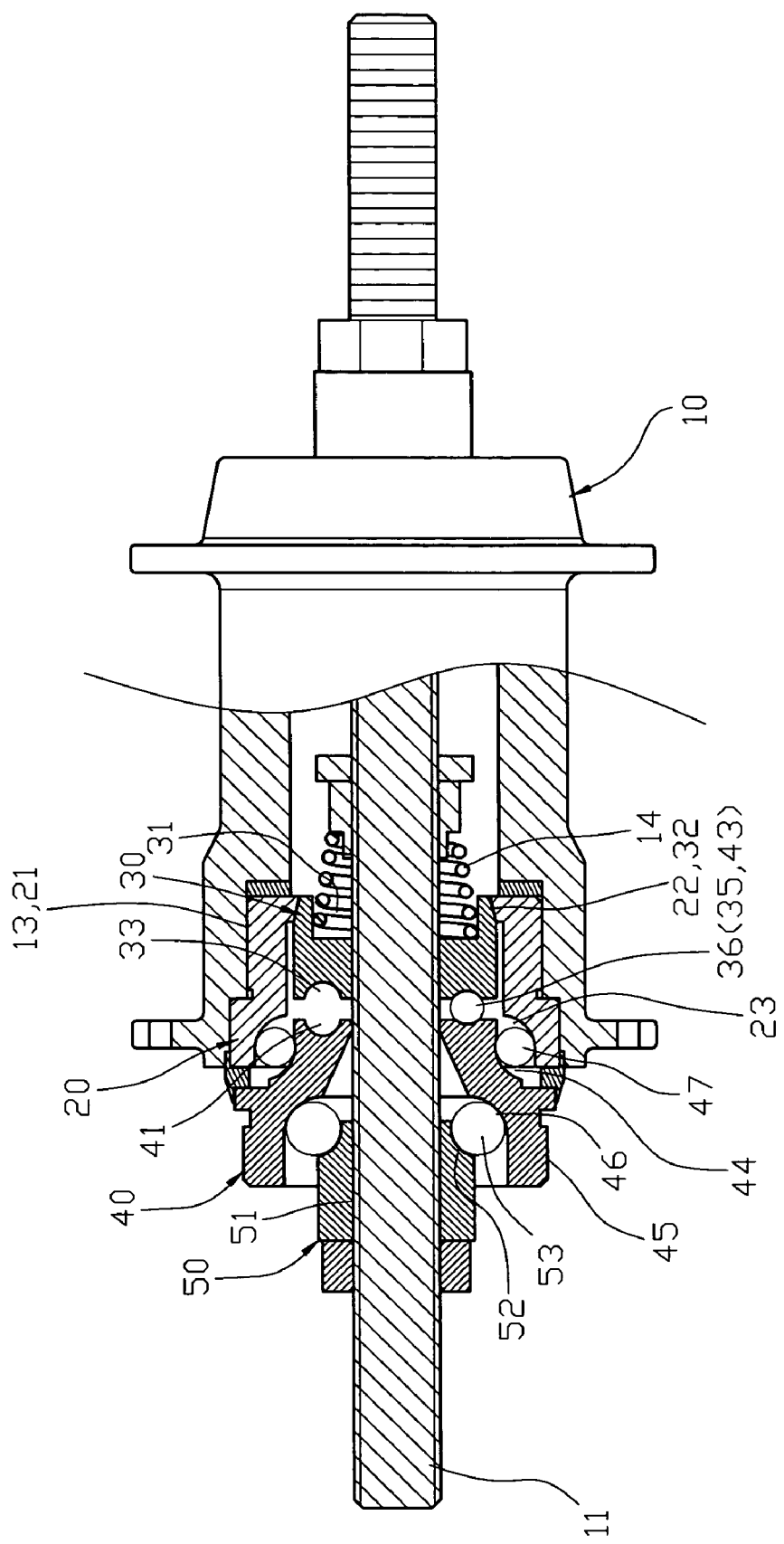
FIG. 4 is a partially plan cross-sectional view of the hub clutch device as shown in FIG. 1.

Referring to the drawings and initially to FIGS. 1–4, a hub clutch device for a bicycle in accordance with the preferred embodiment of the present invention comprises a threaded shaft 11, a hub 10 rotatably mounted on the shaft 11 for mounting a wheel (not shown), a positioning sleeve 20 secured in the hub 10 for rotating the hub 10 and having a first end having an inner wall formed with a tapered face 22, a movable sleeve 30 movably mounted in the positioning sleeve 20 and having a first end having an outer wall formed with a tapered face 32 detachably urged on the tapered face 22 of the positioning sleeve 20 and a second end having a face formed with a plurality of arc-shaped adjusting slots 33, an elastic member 14 mounted on the shaft 11 and biased between the hub 10 and the movable sleeve 30, a fixing seat 40 rotatably mounted on the shaft 11 and having a first end having a face formed with a plurality of arc-shaped adjusting slots 41 each aligning with a respective one of the adjusting slots 33 of the movable sleeve 30, and a plurality of urging balls 36 each movably mounted between a respective one of the adjusting slots 33 of the movable sleeve 30 and a respective one of the adjusting slots 41 of the fixing seat 40.

The hub 10 has an inner wall formed with a recess 12 for mounting the positioning sleeve 20 and an inner thread 13 formed in the recess 12.

The positioning sleeve 20 has an outer wall formed with an outer thread 21 screwed into the inner thread 13 of the hub 10. The positioning sleeve 20 has a second end having an inner wall formed with a slide groove 23.

Each of the adjusting slots 33 of the movable sleeve 30 has a first end formed with a semi-circular receiving portion 34 and a second end formed with a push portion 35 having a depth smaller than that of the receiving portion 34. The first end of the movable sleeve 30 has an inner wall formed with a mounting recess 31 to receive the elastic member 14.

In practice, the directions of the receiving portion 34 and the push portion 35 of each of the adjusting slots 33 of the movable sleeve 30 are arranged according to the travel direction of the bicycle and the mounting direction of the hub 10. Thus, the receiving portion 34 of each of the adjusting slots 33 of the movable sleeve 30 is located at the front side of the travel direction of the bicycle, and the push portion 35 of each of the adjusting slots 33 of the movable sleeve 30 is located at the rear side of the travel direction of the bicycle.

Each of the adjusting slots 41 of the fixing seat 40 has a first end formed with a semi-circular receiving portion 42 and a second end formed with a push portion 43 having a depth smaller than that of the receiving portion 42.

The first end of the fixing seat 40 has an outer wall formed with a slide groove 44, and the hub clutch device further comprises a plurality of rolling balls 47 mounted between the slide groove 44 of the fixing seat 40 and the slide groove 23 of the positioning sleeve 20. The fixing seat 40 has a periphery formed with an outer thread 45 for mounting at least freewheel (not shown).

The fixing seat 40 has a second end having an inner wall formed with a slideway 46, and the hub clutch device further comprises a fixing sleeve 50 secured on the shaft 11 and having an outer wall formed with a slideway 52, and a plurality of rolling balls 53 mounted between the slideway 52 of the fixing sleeve 50 and the slideway 46 of the fixing seat 40. The fixing sleeve 50 has an inner wall formed with a screw bore 51 screwed onto the shaft 11.

Figure 5:
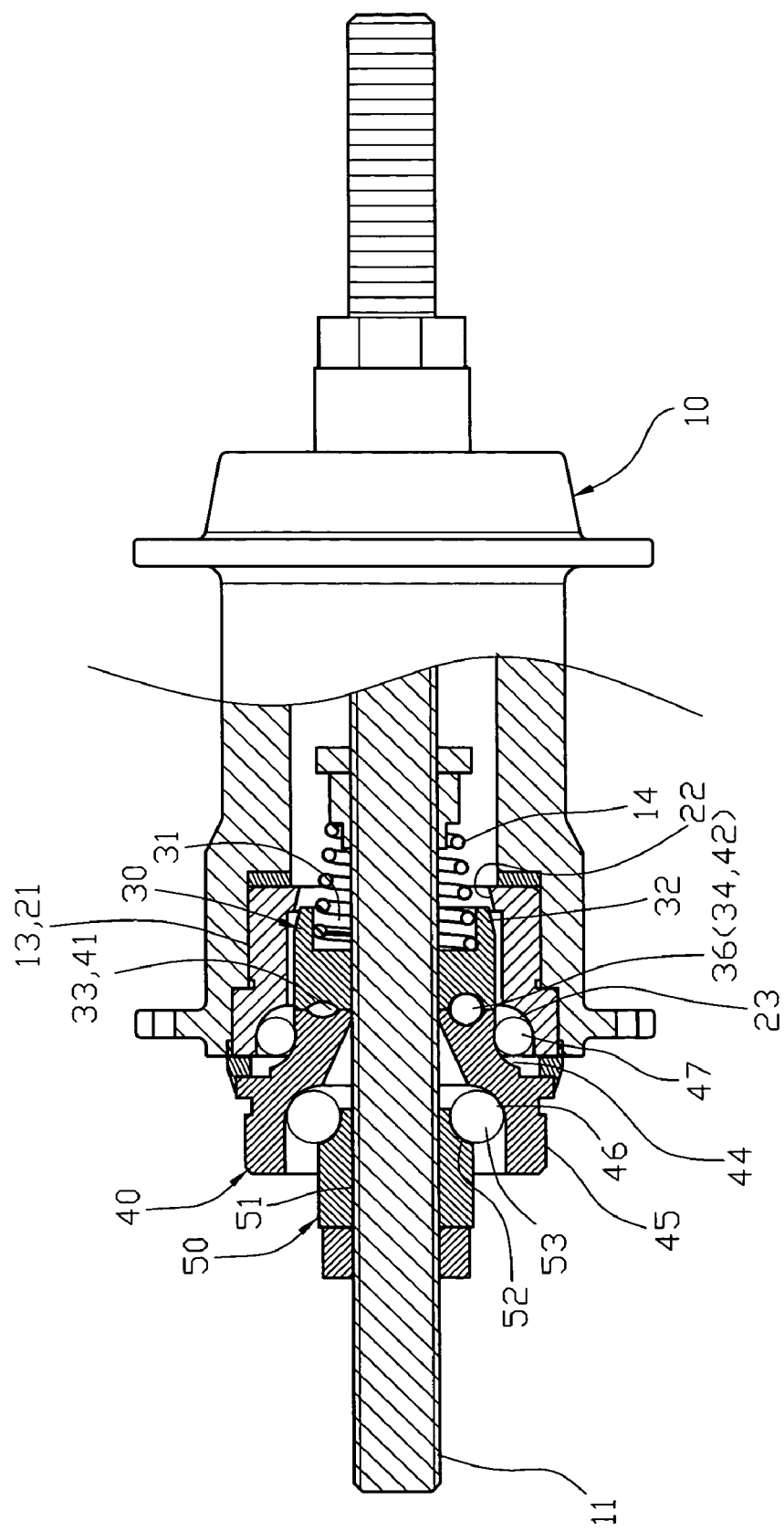
FIG. 5 is a schematic operational view of the hub clutch device as shown in FIG. 4.
Figure 6:
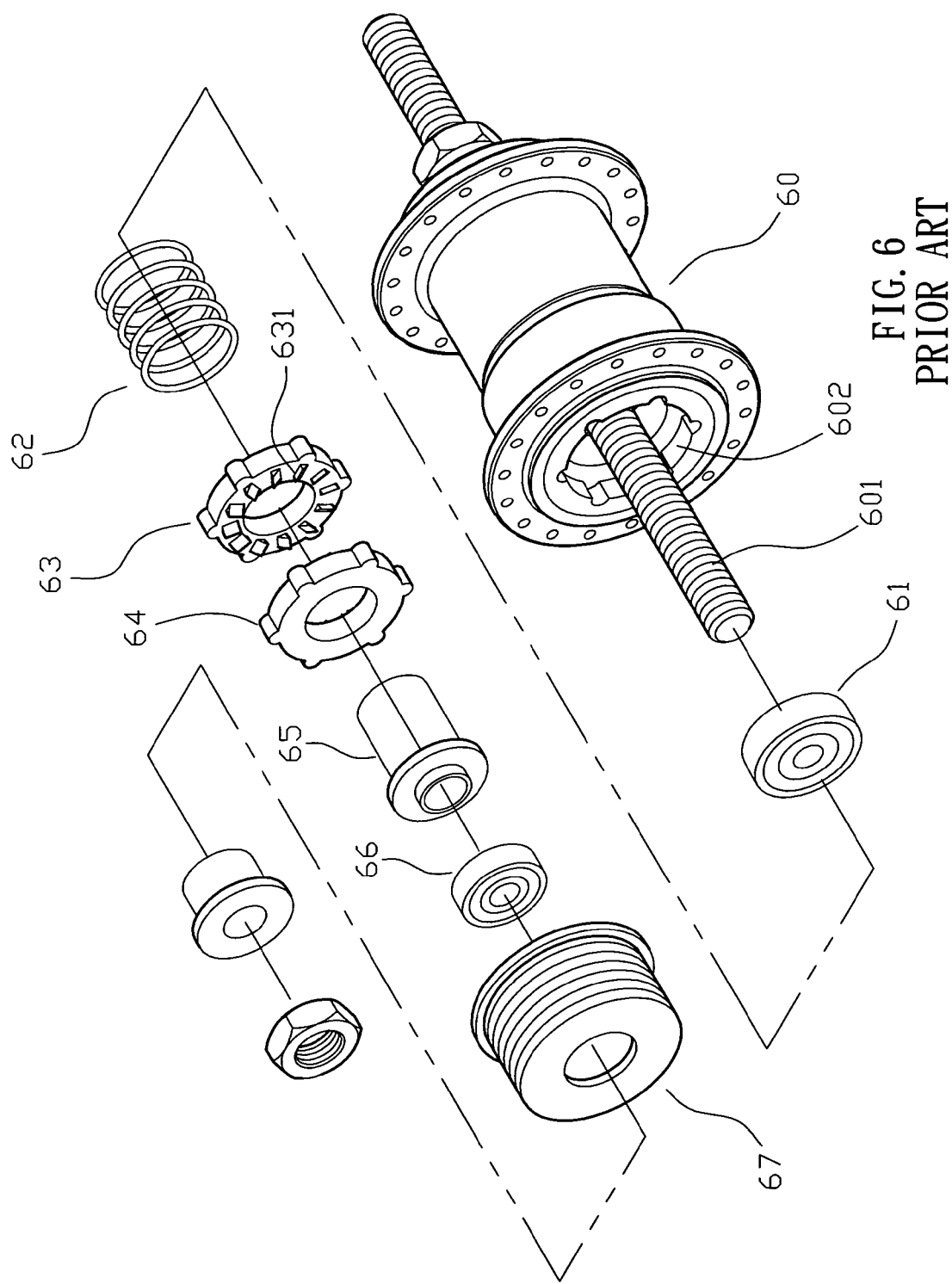
FIG. 6 is an exploded perspective view of a conventional hub clutch device in accordance with the prior art.
Figure 7:
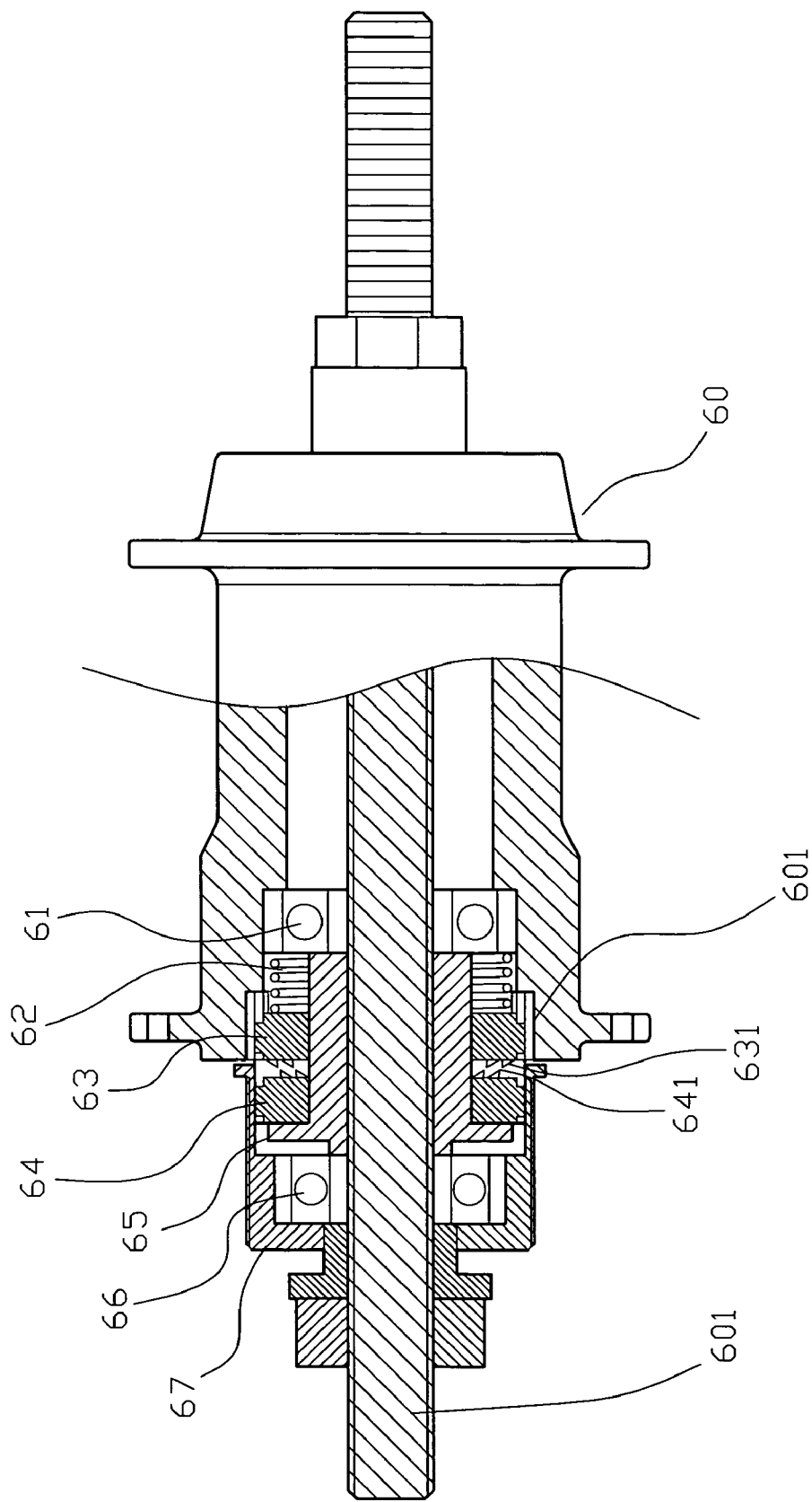
FIG. 7 is a partially plan cross-sectional assembly view of the conventional hub clutch device as shown in FIG. 6.

In operation, referring to FIGS. 1–5, when a pedal (not shown) of the bicycle is stepped, a chainwheel (not shown) is rotated to rotate a chain (not shown) which rotates the freewheel which rotates the fixing seat 40. When the fixing seat 40 is rotated, each of the urging balls 36 is moved to the push portion 35 of a respective one of the adjusting slots 33 of the movable sleeve 30 and the push portion 43 of a respective one of the adjusting slots 41 of the fixing seat 40 to push the movable sleeve 30 to move toward the positioning sleeve 20 and to compress the elastic member 14 until the tapered face 32 of the movable sleeve 30 is urged on the tapered face 22 of the positioning sleeve 20, so that the fixing seat 40, the movable sleeve 30 and the positioning sleeve 20 are combined with each other. Thus, when the fixing seat 40 is rotated, the movable sleeve 30 is driven to rotate the positioning sleeve 20 which rotates the hub 10 so as to drive the wheel to rotate.

When the pedal stops operating, the freewheel stops rotating, so that the force applied on the fixing seat 40 is removed. At this time, the positioning sleeve 20 and the hub 10 are still rotated with the wheel. Thus, when the velocity of the fixing seat 40 is smaller than that of the positioning sleeve 20, each of the urging balls 36 is moved reversely to the receiving portion 34 of a respective one of the adjusting slots 33 of the movable sleeve 30 and the receiving portion 42 of a respective one of the adjusting slots 41 of the fixing seat 40, so that the movable sleeve 30 is pushed backward by the restoring force of the elastic member 14, thereby detaching the tapered face 32 of the movable sleeve 30 from the tapered face 22 of the positioning sleeve 20 so as to detach the fixing seat 40 and the movable sleeve 30 from the positioning sleeve 20. Thus, when the positioning sleeve 20 and the hub 10 are rotated, the fixing seat 40 is not rotated, so that the freewheel will not be rotated by the wheel when the pedal stops operating.

Accordingly, each of the urging balls 36 is moved between a respective one of the adjusting slots 33 of the movable sleeve 30 and a respective one of the adjusting slots 41 of the fixing seat 40 to detach the fixing seat 40 and the movable sleeve 30 from the positioning sleeve 20, so that when the positioning sleeve 20 and the hub 10 are rotated, the fixing seat 40 is not rotated, so that the freewheel will not be rotated by the wheel when the pedal stops operating. In addition, the movable sleeve 30 is engaged with and disengaged from the positioning sleeve 20 by engagement of the tapered faces 32 and 22, so that no noise is produced when the pedal stops operating. Further, it is unnecessary to have a precise fit between the urging balls 36, the adjusting slots 33 of the movable sleeve 30 and the adjusting slots 41 of the fixing seat 40, thereby decreasing costs of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A hub clutch device, comprising:
   a threaded shaft;
   a hub rotatably mounted on the shaft;
   a positioning sleeve secured in the hub for rotating the hub and having a first end having an inner wall formed with a tapered face;
   a movable sleeve movably mounted in the positioning sleeve and having a first end having an outer wall formed with a tapered face detachably urged on the tapered face of the positioning sleeve and a second end having a face formed with a plurality of arc-shaped adjusting slots;
   an elastic member mounted on the shaft and biased between the hub and the movable sleeve;
   a fixing seat rotatably mounted on the shaft and having a first end having a face formed with a plurality of arc-shaped adjusting slots each aligning with a respective one of the adjusting slots of the movable sleeve; and
   a plurality of urging balls each movably mounted between a respective one of the adjusting slots of the movable sleeve and a respective one of the adjusting slots of the fixing seat.

2. The hub clutch device in accordance with claim 1, wherein each of the adjusting slots of the movable sleeve has a first end formed with a receiving portion and a second end formed with a push portion having a depth smaller than that of the receiving portion.

3. The hub clutch device in accordance with claim 2, wherein the receiving portion of each of the adjusting slots of the movable sleeve is semi-circular.

4. The hub clutch device in accordance with claim 1, wherein each of the adjusting slots of the fixing seat has a first end formed with a receiving portion and a second end formed with a push portion having a depth smaller than that of the receiving portion.

5. The hub clutch device in accordance with claim 4, wherein the receiving portion of each of the adjusting slots of the movable sleeve is semi-circular.

6. The hub clutch device in accordance with claim 1, wherein the hub has an inner wall formed with a recess for mounting the positioning sleeve.

7. The hub clutch device in accordance with claim 6, wherein the hub has an inner thread formed in the recess, and the positioning sleeve has an outer wall formed with an outer thread screwed into the inner thread of the hub.

8. The hub clutch device in accordance with claim 1, wherein the positioning sleeve has a second end having an inner wall formed with a slide groove, the first end of the fixing seat has an outer wall formed with a slide groove, and the hub clutch device further comprises a plurality of rolling balls mounted between the slide groove of the fixing seat and the slide groove of the positioning sleeve.

9. The hub clutch device in accordance with claim 1, wherein the first end of the movable sleeve has an inner wall formed with a mounting recess to receive the elastic member.

10. The hub clutch device in accordance with claim 1, wherein the fixing seat has a periphery formed with an outer thread.

11. The hub clutch device in accordance with claim 1, wherein the fixing seat has a second end having an inner wall formed with a slideway, and the hub clutch device further comprises a fixing sleeve secured on the shaft and having an outer wall formed with a slideway, and a plurality of rolling balls mounted between the slideway of the fixing sleeve and the slideway of the fixing seat.

12. The hub clutch device in accordance with claim 1, wherein the fixing sleeve has an inner wall formed with a screw bore screwed onto the shaft.

13. The hub clutch device in accordance with claim 1, wherein when the fixing seat is rotated, each of the urging balls is moved to the push portion of a respective one of the adjusting slots of the movable sleeve and the push portion of a respective one of the adjusting slots of the fixing seat to push the movable sleeve to move toward the positioning sleeve and to compress the elastic member until the tapered face of the movable sleeve is urged on the tapered face of the positioning sleeve, so that the fixing seat, the movable sleeve and the positioning sleeve are combined with each other.

14. The hub clutch device in accordance with claim 13, wherein when a velocity of the fixing seat is smaller than that of the positioning sleeve, each of the urging balls is moved reversely to the receiving portion of a respective one of the adjusting slots of the movable sleeve and the receiving portion of a respective one of the adjusting slots of the fixing seat, so that the movable sleeve is pushed backward by the restoring force of the elastic member, thereby detaching the tapered face of the movable sleeve from the tapered face of the positioning sleeve so as to detach the fixing seat and the movable sleeve from the positioning sleeve.

* * * * *